United States Patent Office 3,413,326
Patented Nov. 26, 1968

3,413,326
ADDITION COMPOUNDS OF AMINO ACIDS AND HYDROFLUORIC ACID OR SOLUBLE FLUORIDES, AND METHOD OF PREPARING THE SAME
Hans Schmid, Muttenz, near Basel, Switzerland, assignor to Gaba, A.G., Basel, Switzerland
No Drawing. Original application Apr. 20, 1964, Ser. No. 361,245. Divided and this application June 9, 1966, Ser. No. 591,044
Claims priority, application Switzerland, Oct. 3, 1956, 38,139/56
20 Claims. (Cl. 260—429.3)

ABSTRACT OF THE DISCLOSURE

Addition compounds of lower aliphatic amino acids with hydrogen fluoride or soluble metal fluoride are effective in the prophylactic treatment of caries. The novel compounds are prepared by reacting amino acid with HF, and recovering the addition compound from the reaction mixture. It is also possible to hydrolyze an albuminous substance such as egg albumen, wheat gluten or the like by heating with conc. HF, neutralizing the reaction mixture with metal hydroxide, and evaporating to dryness.

---

This application is a division of U.S. application Ser. No. 361,245, filed Apr. 20, 1964, now abandoned.

This invention relates to addition compounds of amino acids with hydrogen fluoride or fluoride salts, and to a method for their preparation.

Research during recent years has shown that the element fluorine plays an important part in the constitution of the hard dental substance and that the lack of this element leads to diminished resistance to caries. It is also known that the artificial introduction of this constituent in careful dosage brings about a significant reduction in the incidence of caries. In view of the fact that over 90% of the population of the civilized world suffer to a greater or lesser degree from dental caries the recognition of the above mentioned fact is of a social and hygienic importance that cannot be underestimated. The supplementary introduction of the element fluorine has therefore been widely discussed in recent years and a therapy consisting in the provision of artificially fluorinated food components, preferably in the form of additives to drinking water, salt or milk, as well as in the form of tablets has been actively practiced.

It has also been shown that once a tooth has erupted the above mentioned measures cease to be effective or at least that their efficacy is greatly reduced, but that the tooth is able to absorb fluorine ions from the outside, to bind them chemically, and thence to improve its resistance to caries. This fact gave rise to the prophylactic treatment of caries by topical application of fluoride solutions to the teeth. Although such treatment provides an excellent measure of protection, it is time consuming and expensive and, thus, is not always available to people desiring it. The most practical means of administering fluorine lies in the use of dentifrice or chewing gum compositions.

According to the prior art, fluorine was used substantially in the form of its metal salts such as stannous or sodium fluoride. It has now been found that certain addition compounds of soluble fluorides with lower aliphatic amino acids provide an even greater degree of anticariogenic activity than has been obtained with the metal fluorides.

Accordingly, it is an object of this invention to provide novel fluorine compounds having improved anticariogenic activity.

A further object is to provide a novel method for preparing these new compounds.

Other objects and advantageous features will be obvious from the following detailed description.

Unexpectedly, addition compounds of lower aliphatic amino acids with hydrogen fluoride or soluble metal fluorides have been found to be effective in the prophylactic treatment of caries, many of these compounds having an effect surpassing that of the forementioned metal salts. These compounds are addition compounds having the general formula RX where R is a lower aliphatic amino acid and X is a soluble fluoride which normally dissociates to yield fluoride ions in aqueous solution. Preferably, the lower aliphatic amino acids will contain not more than about 10 carbon atoms in the aliphatic chain. Suitable amino acids include the monoaminomonocarboxylic acids, such as carbamic acid, glycine, alanine, valine, norvaline, leucine, norleucine, isoleucine, isovaline, phenylalanine, tyrosine, serine, alpha-amino-beta-hydroxybutyric acid, cysteine, cystine, betaine and sarcosine. Monoamino-dicarboxylic acids such as aspartic and glutamic acid can also be employed. Operable diamino-monocarboxylic acids include arginine, lysine, ornithine, asparagine and citrulline.

Soluble fluorides which normally dissociate in aqueous solution to yield fluoride ions and can thus comprise the fluoride portion of the addition compounds of this invention include, for example, HF, $SnF_2$, KF, and $ZrF_4$. Hydrofluoric acid and stannous fluoride are especially preferred soluble fluorides. The addition product of an amino acid with HF is an amino acid hydrofluoride. The addition product may be described as a double salt when the soluble fluoride portion is a metal salt.

Amino acid hydrofluorides can be prepared in accordance with this invention by reacting amino acids, either in the dry state or in solution or suspension in suitable media (as more fully hereinafter explained), with aqueous hydrofluoric acid or gaseous hydrogen fluoride. The solvent is then partially evaporated and the hydrofluoride is allowed to crystallize from the cooling mother liquor from which it is then separated. In the case of hydrofluoride salts that do not readily crystallize, the solvent is completely evaporated and the salts remain as a dry or syrupy residue. If left for several days over concentrated sulfuric acid with the exclusion of air, the syrup can be made to crystallize. However, if the hydrofluoride occurs in the form of a suspension it may be separated by filtration. The fluoride portion of the addition compound thus prepared will consist of at least about 1 mol of hydrofluoric acid.

The addition compounds of amino acids and soluble fluorides can be prepared in a simple manner by directly reacting the components in a suitable solvent, for example water. The compounds may be crystallized in concentrated solutions or they may be obtained by evaporation of the solution to dryness.

The invention will be illustrated by reference to a number of examples which are, however, not intended to limit the scope of the invention in any way.

Example I 21.5 g. of glycine together with 19.75 g. of a 38% hydrofluoric acid are heated in a platinum dish over a water bath. The water is then evaporated from the clear solution. By adding 10 milliliters of ethyl alcohol and evaporating again more of the water can be removed. In the course of cooling, the hydrofluoride separates in the form of colorless crystals.

The substance is difficultly soluble in methyl and ethyl alcohol, insoluble in acetone, readily soluble in water.

Formula: $HF \cdot NH_2CH_2COOH$

Example II 17.8 g. of sarcosine and 22.2 g. of a 60% hydrofluoric acid are mixed in a platinum dish. The sarcosine dissolves with the evolution of heat. The dihydrofluoride formed is allowed to crystallize in a sulfuric acid desiccator. The crystals are then quickly filtered off by suction, remoistened with about 5 ml. of water, and filtered off again by suction. The product is dried in a current of warm air between 40 and 50° C.

The substance consists of colorless crystals which are soluble in hot methyl alcohol, difficulty soluble in ethyl alcohol, insoluble in acetone, and easily soluble in water.

The formula of the compound is:

$$CH_3NHCH_2COOH.2HF$$

Example III 21.9 g. of lysine are dissolved in 75 cc. of water and 9.2 g. of a 38% hydrofluoric acid added to the solution. The reaction mixture is evaporated to dryness on a water bath and the residue dried.

The crystals are colorless, difficulty soluble in methyl and ethyl alcohol, insoluble in acetone and readily soluble in water.

Formula:

$$NH_2(CH_2)_4CHCOOH.HF$$
$$\qquad\qquad\quad |$$
$$\qquad\qquad\quad NH_2$$

Example IV 17.8 g. of alanine are dissolved in 21.0 g. of a 38% hydrofluoric acid and evaporated on a water bath. Evaporation is twice repeated, 20 cc. of ethyl alcohol being added each time, and the residue is then dried in vacuo at 50° to 60° C. for two hours. Upon cooling, the syrupy residue gradually begins to crystallize. After separating the crystals by sharp filtration by suction, they are moistened with about 5 ml. of water and again filtered by suction. The product is then carefully dried in a warm current of air at about 40° C.

Alanine hydrofluoride crystallizes in colorless prisms that are difficultly soluble in ethyl alcohol, slightly more soluble in methyl alcohol, and easily soluble in water.

The compound has the following formula:

$$CH_3CHCOOH.HF$$
$$\quad\ |$$
$$\quad\ NH_2$$

Example V 11.6 g. of potassium fluoride are dissolved in 30 cc. of water and 23.4 g. of butaine are added to the solution. The clear solution is partly evaporated on a water bath and then allowed to crystallize. The crystal pulp is filtered by suction, washed with about 5 cc. of alcohol and dried.

The compound consists of colorless crystals, soluble in methyl alcohol, slightly less in ethyl alcohol, but easily soluble in water.

Formula:

$$[(CH_3)_3NCH_2COO]_4.KF$$

Example VI 16.7 g. or zirconium fluoride are dissolved in 150 cc. of water with the simultaneous addition of 4 drops of a 38% hydrofluoric acid. 11.7 g. of betaine are then added to the solution.

The clear reaction mixture is evaporated on a water bath until crystallization begins. It is then cooled and the crystalline mass is rapidly filtered off by suction. The product is dried in vacuo at 50 to 60° C.

The compound consists of colorless crystals, which are difficulty soluble in ethyl and methyl alcohol, insoluble in acetone, and easily soluble in water.

Formula:

$$(CH_3)_3NCH_2COO.ZrF_4$$

Example VII 15.7 g. of stannous fluoride are dissolved in 25 cc. of hot water with the simultaneous addition of 4 drops of a 38% hydrofluoric acid, 7.5 g. of glycine being likewise added to the solution. The clear reaction mixture is evaporated over a water bath until crystallization begins, then cooled, and the crystalline mass quickly filtered off by suction. The product is dried in vacuo at 50 to 60° C.

15.7 g. of stannous fluoride with the addition if necessary, of 1 to 4 drops of a 38% hydrofluoric acid are dissolved in 30 cc. of hot water and 7.5 g. of glycine are added thereto. The solution is evaporated until it has the consistency of a syrup, and then allowed to crystallize. At the end of one or two days the compound has fully crystallized. The crystals are colorless, difficulty soluble in ethyl and methyl alcohol, insoluble in acetone, and readily soluble in water. The aqueous solution easily hydrolyzes, forming the basic stannous fluoride. By adding one drop of hydrofluoric acid hydrolysis can be inhibited.

Formula: $NH_2CH_2COOH.SnF_2$

Example VIII

Aspartic acid is reacted with stannous fluoride in the manner described in Example VII.

Formula:

$$NH_2CHCH_2COOH.SnF_2$$
$$\quad\ |$$
$$\quad\ COOH$$

Each of the following addition compounds can be prepared by reacting the indicated amino acid with soluble fluorides:

| | |
|---|---|
| histidine dihydrofluoride | $CH=C-CH_2-C-COOH.2HF$ (with NH, N, H, CH ring) |
| betaine hydrofluoride | $(CH_3)_3NCH_2COO.HF$ |
| cysteine hydrofluoride | $HSCH_2CHCOOH.HF$ with $NH_2$ |
| sarcosine stannous fluoride | $CH_3NHCH_2COOH.SnF_2$ |
| lysine stannous fluoride | $NH_2(CH_2)_4CHCOOH.SnF_2$ with $NH_2$ |
| alanine stannous fluoride | $CH_3CHCOOH.SnF_2$ with $NH_2$ |
| glycine potassium fluoride | $NH_2CH_2COOH.KF$ |
| sarcosine potassium fluoride | $CH_3NHCH_2COOH.KF$ |
| norvaline stannous fluoride | $CH_3CH_2CH_2CHCOOH.SnF_2$ with $NH_2$ |
| glutamic acid stannous fluoride | $NH_2CH.COOH.SnF_2$ with $CH_2CH_2COOH$ |
| sarcosine zirconium fluoride | $CH_3NHCH_2COOH.ZrF_4$ |

In like manner all of the amino acids described as operable herein can be reacted with the above salts or hydrofluoric acid to yield the corresponding addition product.

Mixtures of amino-acid hydrofluorides can be conveniently prepared by hydrolysis of albuminous substances with hydrofluoric acid. These hydrolysates can be obtained by heating albuminous substances, such as egg albumen, blood albumen, casein, gluten, keratin, for several hours with concentrated hydrofluoric acid (preferably 35% to 60%). The reaction time can vary substantially, hydrolysis and addition being sufficiently complete for the purposes of this invention in about 7 hours. Longer reaction times can be employed but there is no substantial improvement in yield. After hydrolysis the reaction mixture is evaporated to dryness. The residues contain an average of 10-20% HF and are very largely water-soluble. Preferably the mixture is neutralized with metal hydroxides before final evaporation. The product then consists of addition compounds of fluorides with the amino acids formed, as well as of free fluorides. The metal hydroxides employed in the neutralization step are those which form soluble fluorides, e.g., KOH, NaOH, Sn(OH)$_2$ and LiOH.

Example IX 15 g. of wheat gluten are heated with 60 g. of 38% hydrofluoric acid on a water bath for 7 hours and then evaporated to dryness in vacuo at 60° C.

17 g. of a brown residue which is nearly wholly soluble in water and containing 17.0% HF remains. The residue consists predominantly of a mixture of hydrofluorides of the amino acids arginine, lysine, tyrosine, phenylalanine, cystine, methionine, threonine, leucine, isoleucine, valine, glycine, alanine and glutamic acid.

Example X

The anticariogenic efficacy of the compounds of this invention was established in the following manner. Freshly extracted, mainly caries-free molars and bicuspids which were stored in physiologic saline from 1 to 10 days at a temperature of 2° C., were mechanically cleaned and brushed with tap water and pumice. The roots and occasional initial caries lesions were covered with wax. The crowns were then exposed for 4–20 hours to the substance to be tested, in aqueous solutions (50 milliliters) at a pH of 2.9. After this treatment, the teeth were washed for 30 minutes in physiologic saline, the latter being agitated and renewed three times. The crowns were not brushed. They were decalcified in a horizontal shaker at a temperature of 37° C. in 12.5 cc. of a phthalate buffer and distilled water at a 1:1 ratio and at a pH of 4. The protected enamel of the teeth was demineralized during a three hour period ("3 hour" values). The following values were obtained when treating teeth in the above defined way with the indicated compounds. In the following table the designation S.R.R. refers to the solution rate reduction in percent for calcium and phosphorus removal from intact enamel treated with the indicated compounds at a pH of 2.9 and a fluorine concentration of 0.1%, the treatments having been carried out for three hours as stated above.

Table

| Compound tested: | S.R.R. percent |
| --- | --- |
| (a) Sodium fluoride | 71 |
| (b) Stannous fluoride | 69 |
| (c) Lysine·KF | 87 |
| (d) Leucine·HF | 84 |
| (e) Cystine·HF | 79 |
| (f) Cystine amine·HF | 92 |

It will be observed that the values obtained employing representative amino acid compounds of this invention when compared with sodium fluoride and stannous fluoride, both of which substances are considered to be highly active against dental caries formation, the former compounds are manifestly superior. It is assumed that the improved enamel protection is arrived at by the combination of a chemical reaction due to the fluorides and physical-chemical processes due to the organic part of the organic fluorides. This procedure can be correlated with in vivo caries reduction insofar as reduced enamel solubility results in reduced caries formation.

The preparations the invention proposes to use for the care of teeth, apart from the reagents that have been described, may contain the conventional additives such as polishing agents, e.g., calcium phosphates, calcium carbonate, magnesium carbonate, calcium sulfate, and insoluble precipitated alkaline earth fluorides. However, to insure the availability of the fluoride ions over long periods of time, toothpaste formulations should preferably contain calcium polyphosphates, calcium metaphosphate, calcium oxyapatite, beta- and alpha-tricalcium orthophosphate. They may also contain surface-active substances which serve as foam-forming and wetting agents, as well as aromas, and flavors. In paste-like preparations, mucilages such as tragacanth, carragheen, methyl cellulose, carboxymethylcellulose, and softening agents, such as glycerin, sorbitol syrup and glucose syrup, may be incorporated.

Liquid preparations for cleaning the teeth may principally consist of an aqueous or preferably aqueous-alcoholic solution of compounds according to the invention in conjunction with the customary additives, such as flavoring and aroma substances, emulsifiers, non-soap sudsing and detergent agents, soap, glycerin, sorbitol syrup, and drug extracts.

The fluorine content of paste-like and pulverulent dentifrices can be between 0.01 and 4% by weight, preferably between 0.05 and 2% by weight.

Example XI

A toothpaste is prepared having the following composition:

| | Percent by weight |
| --- | --- |
| Sodium carboxymethylcellulose | 1.10 |
| Magnesium aluminum silicate | 0.40 |
| Humectants | 30.00 |
| Calcium metaphosphate | 40.00 |
| Betaine potassium fluoride | 2.77 |
| Lauryl alcohol sulfate | .70 |
| Flavor and sweetening | Q.s. |
| Water | Balance |

The betaine potassium fluoride employed in the above formulation can be replaced with a quantity of cystine hydrofluoride, histidine dihydrofluoride or the mixture of amino acid hydrofluoride of Example IX sufficient to provide an equivalent amount of fluorine without substantially affecting the anticaries efficacy of the composition.

Example XII

A tooth powder is prepared having the following composition:

| | Percent by weight |
| --- | --- |
| Dicalcium phosphate | 74.95 |
| Colloidal kaolin | 20.0 |
| Aroma substances | 1.5 |
| Sodium lauryl sulfonate | 3.0 |
| Sarcosine-monohydrofluoride | 0.55 |

This composition provides an effective means for caries prophylaxis when used in the conventional manner. The sarcosine-monohydrofluoride can be replcaed with alanine hydrofluoride, methionine hydrofluoride or arginine hydrofluoride in an amount sufficient to provide an equal amount of fluorine with substantially equivalent results.

Example XIII

A mouthwash is prepared acocrding to the following formula:

| | Percent by weight |
| --- | --- |
| Ethyl alcohol 50% | 74.0 |
| Aroma substances | 5.0 |
| Sulforicinoleate of sodium | 7.5 |
| Lysine-potassium fluoride | 13.5 |

For use, the preparation is strongly diluted, for instance 2 cc. being made up to 50 cc. with water, so that the concentration of fluorine in use is 0.05%.

Example XIV

A chewing gum is prepared having the following composition:

| | | |
| --- | --- | --- |
| Gum base | percent by weight | 21.0 |
| Estergum | parts | 30 |
| Coumarone resin | do | 45 |
| Latex (dry) | do | 15 |
| Paraffin wax (M.P. 180° F.) | do | 10 |
| Sugar | percent by weight | 59.5 |
| Corn syrup (Baumé 45) | do | 18.2 |
| Flavoring | do | Q.s. |
| Cystine hydrofluoride | do | 1.0 |

Example XV

A fluorine tablet can be prepared according to the following recipe:

| | Percent |
|---|---|
| Glycine-potassium fluoride (corr. to 0.25% F.) | 1.75 |
| Lactose | 76.25 |
| Starch | 20.0 |
| Gum arabic | 1.0 |
| Magnesium stearate | 1.0 |
| | 100.0 |

In each of the compositions of the above examples the organic fluoride employed may be replaced by any of the other organic fluorides described herein.

What is claimed is:

1. An anticariogenic addition compound having the formula R.nX where R is a lower aliphatic amino acid and X is a soluble fluorine-containing compound which normally dissociates to yield fluorine ions in aqueous solution and is selected from the group consisting of HF, alkali metal fluoride, $SnF_4$ and $ZrF_4$ and wherein $n$ is 1 or 2 when X is HF and being 1 when X is alkali metal fluoride, $SnF_4$ or $ZrF_4$.

2. An anticariogenic addition compound according to claim 1 in which X consists of at least about 1 mol of HF.

3. An anticariogenic addition compound according to claim 1 in which X is alkali metal fluoride, $SNF_4$ or $ZrF_4$.

4. A compound according to claim 2, namely glycine.HF.

5. A compound according to claim 2, namely, sarcosine.2HF.

6. A compound according to claim 2, namely, lysine.HF.

7. A compound according to claim 2, namely, alanine.HF.

8. A compound according to claim 2, namely, betaine.HF.

9. A compound according to claim 3, namely betaine.KF.

10. A compound according to claim 3, namely, betaine.$ZrF_4$.

11. A compound according to claim 3, namely, glycine.$SnF_4$.

12. A compound according to claim 3, namely, lysine.KF.

13. A compound according to claim 2, namely, leucine.HF.

14. A compound according to claim 2, namely, cystine.HF.

15. A compound according to claim 2, namely cystine amine.HF.

16. A compound according to claim 2, namely, sarcosine.HF.

17. A compound according to claim 2, namely, methionine.HF.

18. A compound according to claim 2, namely, arginine.HF.

19. A compound according to claim 3, namely aspartic acid.$SnF_2$.

20. A compound according to claim 2, namely, glycine.KF.

References Cited

UNITED STATES PATENTS

| | | | |
|---|---|---|---|
| 1,582,472 | 4/1926 | Ikeda | 260—527 |
| Re. 23,344 | 2/1951 | Holgan et al. | 260—527 XR |
| 2,525,902 | 10/1950 | Holgan et al. | 260—527 XR |
| 1,634,221 | 6/1927 | Tressler | 260—501 |
| 1,976,997 | 10/1934 | Kanao | 260—534 |
| 2,267,971 | 12/1941 | Braun | 260—534 |
| 2,477,149 | 7/1949 | Sheehan | 260—534 |
| 2,579,283 | 12/1951 | Vines | 260—534 |
| 2,749,213 | 6/1956 | Bruce | 260—429.7 X |
| 3,175,951 | 3/1965 | Tucker | 167—93 |

FOREIGN PATENTS 543,066  7/1957  Canada.

OTHER REFERENCES

Greenstein et al., Chemistry of the Amino Acids, John Wiley & Sons, New York, pp. 649, 650, (1961).

Duschinsky, "Chemistry and Industry," January 1934, p. 10.

I Chemical Abstracts, vol. 50, 1956, p. 12819a.

II Chemical Abstracts, vol. 57, 1962, p. 452.

TOBIAS E. LEVOW, *Primary Examiner.*

H. M. S. SNEED, *Assistant Examiner.*